Figure 1:
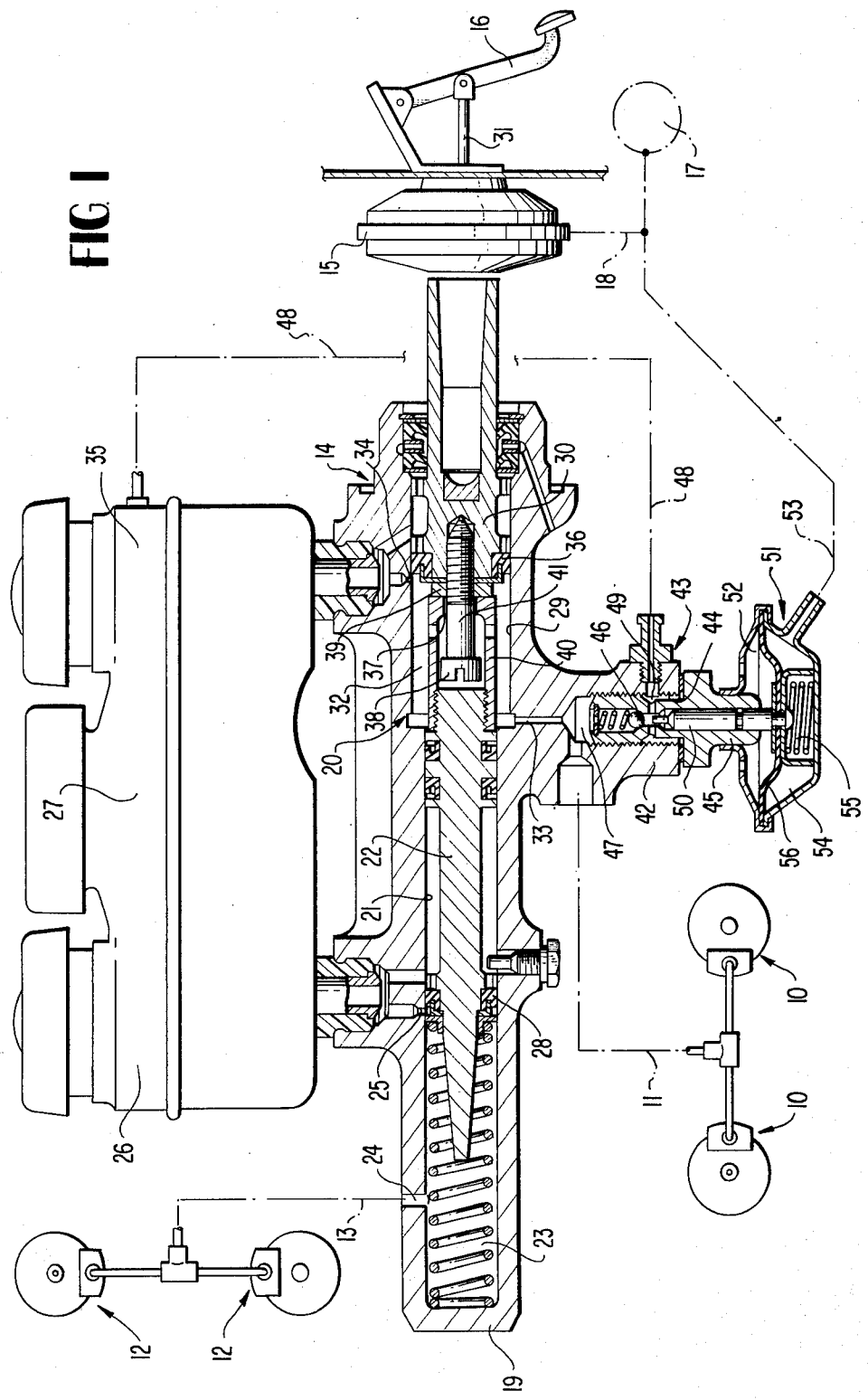

United States Patent [19]
Kruse et al.

[11] 3,978,670
[45] Sept. 7, 1976

[54] MULTI-CIRCUIT BRAKE INSTALLATION FOR VEHICLES

[75] Inventors: Werner Kruse, Schornbach; Reinhard Resch, Stuttgart, both of Germany

[73] Assignee: Daimler-Benz Aktiengesellschaft, Germany

[22] Filed: Oct. 17, 1975

[21] Appl. No.: 623,253

[30] Foreign Application Priority Data

Oct. 24, 1974  Germany............................ 2450474

[52] U.S. Cl. .................................. 60/562; 60/592; 60/553; 188/357; 188/345
[51] Int. Cl.² ......................................... F15B 7/00
[58] Field of Search ............ 60/549, 550, 557, 561, 60/562, 535, 543, 553, 590, 592; 188/345, 357; 91/372, 377, 391; 303/21 AF, 21 B, 84 A

[56] References Cited
UNITED STATES PATENTS

| | | |
|---|---|---|
| 2,680,349 | 6/1954 | Hill et al. .............................. 60/555 |
| 2,875,582 | 3/1959 | Hill ....................................... 60/549 |
| 2,915,047 | 12/1959 | Bradbury ......................... 60/555 X |
| 3,165,031 | 1/1965 | Rockwell ......................... 60/555 X |
| 3,683,619 | 8/1972 | Belart .............................. 60/562 X |
| 3,922,857 | 12/1975 | Carey.................................... 60/562 |

Primary Examiner—Martin P. Schwadron
Assistant Examiner—H. Burks, Sr.
Attorney, Agent, or Firm—Craig & Antonelli

[57] ABSTRACT

A multi-circuit brake installation for vehicles, in which two transmitter brake pistons which possess differently large effective brake pressure piston areas and which are hydraulically connected with each other, operate within a master brake cylinder actuatable at will by means of a servo-assist; these two transmitter brake pistons are connected into a respective brake circuit and are provided with corresponding means for limiting the relative movement with respect to one another, whereby control means are provided independent of the brake circuit for disengaging the hydraulic drive connection between the two transmitter pistons, which are displaced positively into the disengaging position exclusively upon the occurrence of a critical value of the servo-assist.

27 Claims, 2 Drawing Figures

MULTI-CIRCUIT BRAKE INSTALLATION FOR VEHICLES

The present invention relates to a multi-circuit brake installation for vehicles, in which at least two transmitter brake pistons with a mutual hydraulic drive connection therebetween and with differently large effective brake pressure piston areas, operate in a master brake cylinder actuatable at will with servo-assist and in which these two transmitter brake pistons which are connected into a respective brake circuit, are provided with corresponding means for limiting the mutual relative movement with respect to one another.

Brake installations of this type, however without servo-assist, are known in the prior art (German Offenlegungsschrift 2,136,663) and operate in such a manner that as a result of failure of one of the brake circuits, the hydraulic driving connection between two transmitter brake pistons is disconnected, i.e., effectively rendered inoperative, and these two transmitter brake pistons are brought into rigid abutment relative to one another whereby the piston brake pressure surface that renders noticeable the reaction brake pressure force, is reduced in every case and therewith a higher hydraulic transmission ratio is established. A shortening of the actuating idling-stroke or lost-motion stroke is achieved in case of failure of a brake circuit by the means limiting the relative movement between the two transmitter brake pistons having a hydraulic driving connection as compared to an exclusively floating piston arrangement.

In a prior art servo-brake apparatus operating as servo-assist during the actuation at will of a master brake cylinder (German Offenlegungsschrift 2,347,818) the disadvantage obtains during the failure of the servo-force that the pedal stroke is enlarged by the hydraulic transmission ratio of two servo-pistons having differently large effective piston pressure areas and a mutual hydraulic drive connection. In this prior art servo-brake apparatus, the disconnection or disengagement of the hydraulic drive connection between the two servo-pistons takes place by a by-pass valve controlled by differential pressure, which in case of failure of the servo-pressure connects with each other the two pressure chambers on the two sides of the larger servo-piston. Since this known servo-brake apparatus operates with two servo-pistons as compared to conventional servo-brake apparatus, it has a greater axial structural length so that its use with vehicles designed for servo-brake apparatus as hitherto customary is not possible without further measures for structural reasons.

The task underlying the present invention essentially consists in undertaking measures in a multi-circuit brake installation of the aforementioned type operating with servo-assist in order to assure in case of failure of the servo-assist an actuation at will of the master brake cylinder with small actuating idling strokes.

The underlying problems are solved according to the present invention in an advantageous manner by means for disengaging or disconnecting a hydraulic drive connection independent of the brake circuits which are positively brought into the disconnecting position exclusively during the occurrence of a critical value of the servo-assist.

The brake installation according to the present invention operates in case of failure of the servo-assist in the same manner as in case of failure of a brake circuit, i.e., with small actuating idling strokes and with an increase of the brake pressure in the non-disconnected brake circuit. Appropriately, that brake pressure in the master brake cylinder is pressure-relieved for purposes of disconnecting or disengaging the hydraulic drive connection in case of failure of the servo-assist, which is connected to a brake circuit with smaller intended or rated brake output. A further advantage of the present invention resides in the fact that with the brake installation according to the present invention, also the customary servo-brake apparatus operating with vacuum and having only a single servo-piston can be used.

For purposes of avoiding brake-fluid losses, in case of failure of the servo-assist, and servicing operations conditioned thereby, it is additionally advantageous in the brake installation according to the present invention that the brake pressure chamber of the master brake cylinder which is pressure-relieved with a disconnected hydaulic drive connection, is adapted to be closed off with respect to its associated brake circuit.

In order to maintain all brake circuits operational in the brake installation according to the present invention in case of failure of the servo-assist, it is further advantageous that the brake circuit belonging to the brake pressure chamber of the master brake cylinder which is pressure-relieved with a disconnected hydraulic drive connection, is adapted to be shifted to a different brake circuit.

In order to maintain during failure of the servo-assist the independence as regards their separate brake fluid columns of the brake circuits effectively connected together, it is appropriate in the brake installation according to the present invention that limitedly movable, pressure-transmitting separating means are adapted to be interconnected between the two brake circuits adapted to be effectively connected together.

In a construction of the brake installation according to the present invention which is advantageous with respect to the simple structural realization of the means for disconnecting or disengaging a hydraulic drive connection, provision is made according to the present invention that the housing of the master brake cylinder is provided with a short valve-housing connecting stub for a disconnecting or by-pass valve.

It is proposed in the brake installation according to the present invention for the structurally advantageous realization of the means for separating the brake fluid columns of the brake circuits effectively connected together that a separating cylinder is subdivided into two brake pressure chambers by pressure-transmitting separating means, of which one brake pressure chamber is provided with a pressure medium connection for the connection with the means for shifting the brake circuit which belongs to the pressure-relieved brake-pressure chamber of the master brake cylinder pressure-relieved by the disengagement of the hydraulic drive connection, to another brake circuit, and of which the other brake pressure chamber is provided with a pressure-medium connection for the other brake circuit.

For purposes of avoiding sealing places in the separating cylinder which are adapted to be acted upon on one side by the brake fluid column of the one brake circuit and on the other side by the other brake fluid column of the other brake circuit, it is additionally advantageous in the brake installation according to the present invention that the separating cylinder is provided with a separating chamber disposed between its brake pressure chambers and traversed by the separating means and that the separating means are provided with two sealing arrangements enclosing therebetween the separating chamber, of which one sealing arrangement separates in a pressure-tight manner one brake pressure chamber with respect to the separating chamber and the other sealing arrangement separates in a pressure-tight manner the other brake pressure chamber with respect to the separating chamber.

A construction of the brake installation according to the present invention which is advantageous with respect to a simple structural design both of the means for disconnecting or disengaging a hydraulic drive connection as also of the means for connecting together two brake circuits, is realized by a double-valve shiftable between a working position and a disconnecting position and having a zero or discharge connection adapted to be pressure-relieved, a connection for the disconnection or disengagement of a hydraulic drive connection, a connection for the brake circuit belonging to the brake pressure chamber of the master brake cylinder pressure-relieved by the disconnection of the hydraulic drive connection, and a connection belonging to another brake circuit, which in its operating position connects the connection for the disengagement or disconnection of the hydraulic drive connection with the connection for the brake circuit belonging to the brake pressure chamber of the master brake cylinder pressure-relieved by the disengagement of the hydraulic drive connection and which closes off the remaining connections—whereas in its disconnected position, it connects the connection for the disengagement of the hydraulic drive connection with the zero or discharge connection and connects the two remaining connections with one another.

In order to keep small the number of the means conducting the brake pressure in the brake installation according to the present invention, it is advantageous that the master brake cylinder and separating cylinder are unitary, i.e., in one piece.

Accordingly, it is an object of the present invention to provide a multi-circuit brake installation for vehicles which avoids by simple means the aforementioned shortcomings and drawbacks encountered in the prior art.

Another object of the present invention resides in a multi-circuit brake installation for vehicles operating with a servo-force in which the pedal stroke, in case of failure of the servo-force, is not enlarged to any significant extent.

A further object of the present invention resides in a multi-circuit servo-brake installation for motor vehicles which is of relatively short axial length and can thus be installed without difficulty in vehicles designed for the hitherto customary servo-brake apparatus.

Still a further object of the present invention resides in a multi-circuit brake installation for vehicles in which in case of failure of the servo-assist, an actuation at will of the master brake cylinder with small actuating idling strokes is assured.

Another object of the present invention resides in a multi-circuit brake installation for vehicles operating with a servo-assist, in which only a single servo-piston has to be used.

Still another object of the present invention resides in a multi-circuit brake installation of the type described above in which brake fluid losses are effectively prevented and all brake circuits are kept operational even though the servo-assist may have failed.

A further object of the present invention resides in a servo-brake installation of the type described above which is simple in construction, utilizes relatively simple means for disengaging the hydraulic drive connection and provides for easy installation for connection of the various parts.

Figure 2:
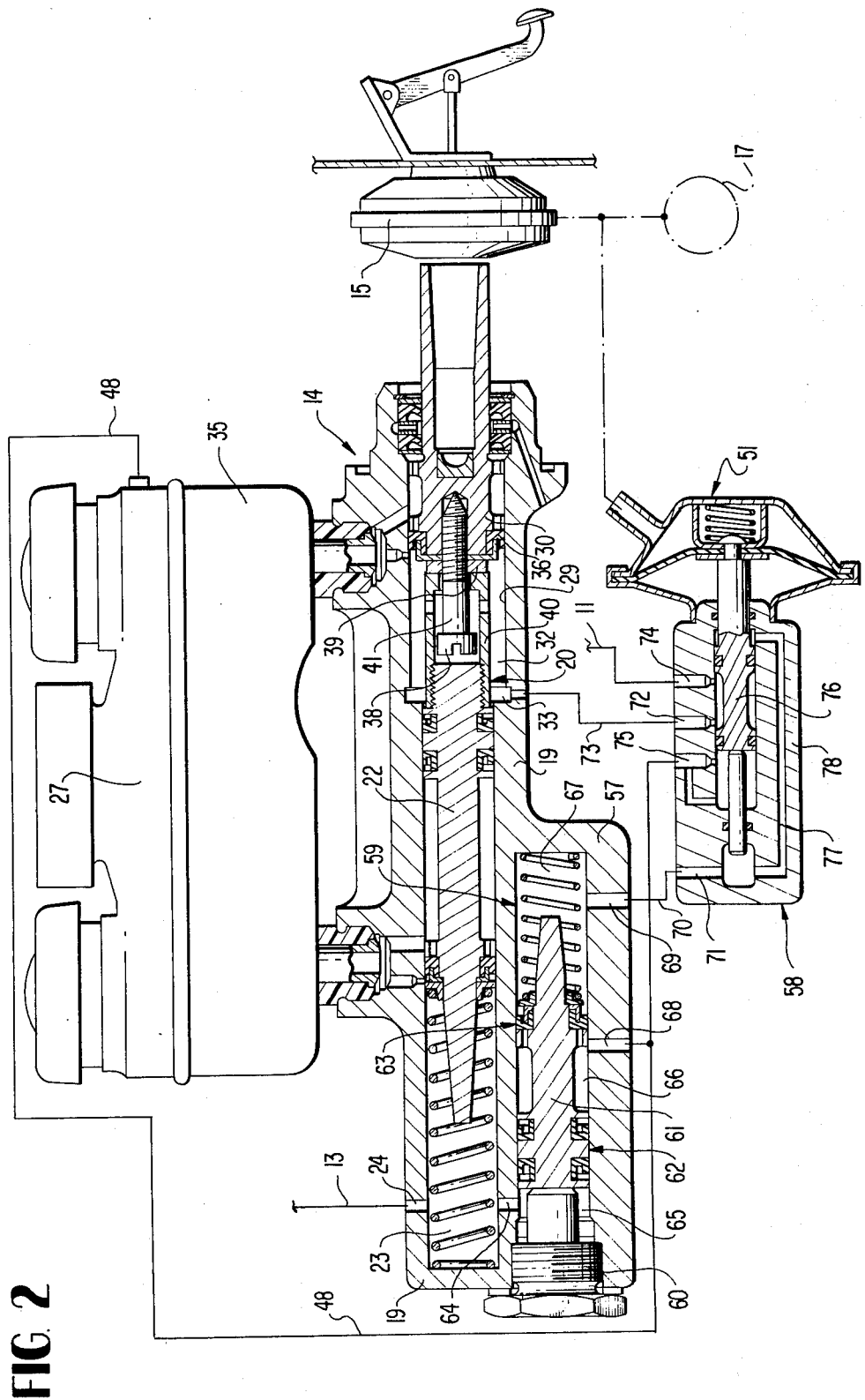

These and further objects, features and advantages of the present invention will become more apparent from the following description when taken in connection with the accompanying drawing which shows, for purposes of illustration only, two embodiments in accordance with the present invention, and wherein:

FIG. 1 is a schematic view of a first embodiment of a two-circuit brake installation according to the present invention with a tandem-master brake cylinder, which includes a by-pass valve and is shown in partial vertical longitudinal cross section together with the by-pass valve; and FIG. 2 is a schematic view of a second embodiment of a two-circuit brake installation according to the present invention provided with a tandem master brake cylinder, which includes a separating cylinder and is illustrated in partial vertical longitudinal cross section together with a double-valve.

Referring now to the drawing wherein like reference numerals are used throughout the various views to designate like parts, and more particularly to FIG. 1, in the embodiment of this figure, the disk brakes generally designated by reference numeral 10 of one vehicle axle are connected to a primary brake circuit 11 and the disk brakes generally designated by reference numeral 12 of another vehicle axle are connected to a secondary brake circuit 13. The brake pressure in the two brake circuits 11 and 13 is established by a tandem master brake cylinder generally designated by reference numeral 14 which is actuatable at will with the assist of a servo-brake apparatus 15 of conventional type by way of a brake pedal 16. The vacuum of a vacuum source 17 is utilized as servo-force for the servo-brake apparatus 15, with which the servo-brake apparatus 15 is connected by means of a vacuum line 18.

The housing 19 of the brake cylinder 14 is provided with a cylinder bore generally designated by reference numeral 20 offset step-shaped in its diameter, whose narrower bore section 21 is closed off at one end by an end wall of the housing 19 and receives a secondary transmitter piston 22 which is correspondingly narrow in its diameter. The secondary transmitter brake piston 22 closes off a secondary brake pressure chamber 23 of the narrow bore section 21 which is in continuous communication by way of a cylinder connection 24 with the secondary brake circuit 13 and in the illustrated disengaged or released position of the secondary transmitter brake piston 22 is in communication by way of an expansion port or snifting connection 25 of the housing 19 with a separate brake fluid chamber 26 of a reservoir tank 27 for brake fluid mounted on the housing 19. The expansion port or breather connection 25 cooperates with a sealing sleeve 28 of the secondary transmitter brake piston 22 in such a manner that upon the actuation of the brake pedal 16 the sealing sleeve 28 closes off the brake pressure chamber 23 with respect to the expansion port or breather connection 25 whereby a brake pressure builds up in the brake pressure chamber 23.

A primary transmitter piston 30 inserted into the wider bore section 29 of the cylinder bore 20 and correspondingly wider in its diameter is connected with the brake pedal 16 by way of a linkage 31 and together with the secondary transmitter brake piston 22 encloses a primary brake pressure chamber 32 of the wider bore section 29, which is in continuous communication by way of a cylinder connection 33 with the primary brake circuit 11 and in the illustrated disengaged or released position of the primary transmitter brake piston 30 is in communication by way of a snifting connection or expansion port 34 with a further separate brake fluid chamber 35 of the reservoir tank 27. A sealing sleeve 36 of the primary transmitter piston 30 thereby cooperates with the snifting connection or expansion port 34 in such a manner that with the actuation of the brake pedal 16, the brake pressure chamber 32 is closed off with respect to the snifting connection or expansion port 34 so that a brake pressure builds up in the brake pressure chamber 32.

By reason of the law of continuity, the narrower secondary transmitter brake piston 22 leads or precedes the wider primary transmitter brake piston 30 so that a hydraulic drive connection exists between these two pistons and the brake pressures in the two brake circuits 11 and 13 are equalized.

In order to keep small the relative movement between the two transmitter brake pistons 22 and 30 and therewith the idling stroke of the pedal 16 and of the linkage 31 during a failure of one of the two brake circuits 11 or 13, as a result of which also the associated brake pressure chamber 32 or 23 is pressure-relieved and therewith the hydraulic drive connection between the transmitter brake pistons 22 and 30 is disengaged or disconnected, the secondary transmitter brake piston 22 is provided with an abutment 37 and the primary transmitter brake piston 30 with two corresponding counter-abutments 38 and 39. The abutment 37 is formed by the bottom of a pot-shaped abutment bush or sleeve 40 which is coaxially arranged to the secondary transmitter brake piston 22 and is securely threadably connected therewith. The head of an abutment screw 41 which extends with radial play through a coaxial opening of the bottom of the abutment bush 40, serves as counter-abutment 38; the abutment screw 41 is securely threadably connected with the primary transmitter brake piston 30 and is simultaneously the fastening means for an annular disk forming the other counter-abutment 39. For limiting the oppositely directed relative movement between the transmitter brake pistons 22 and 30, i.e., the relative movement away from one another (in case of failure of the brake circuit 13 and of the pressure relief of the brake pressure chamber 23 conditioned thereby), the abutment 37 comes into abutment with the counter-abutment 38 so that upon actuation of the brake pedal 16, the two transmitter brake pistons 20 and 33 are rigidly coupled with one another and only the small annular area resulting from the difference of the piston brake pressure areas operates as reaction pressure area acting back on the brake pedal 16, whereby with the same brake actuating force the brake pressure in the brake circuit 11 which now operates alone, is increased.

A corresponding increase of the brake pressure in the brake circuit 13 occurs, when the brake circuit 11 fails and as a result thereof, the brake pressure chamber 32 becomes pressure-relieved. Also in this case, the hydraulic drive connection between the transmitter brake pistons 22 and 30 is disengaged or disconnected which thereby come into mutual rigid coupling by way of the abutment 37 and the counter-abutment 39 so that now only the smaller brake pressure piston area of the secondary transmitter brake piston 22 still acts back as reaction on the brake pedal 16 whereby with the same brake actuating force, the brake pressure in the brake circuit 13 is increased.

According to the present invention, a possibility for disengaging or disconnecting the hydraulic drive connection between the transmitter brake pistons 22 and 30 which is independent of the operating condition of the brake circuits 11 and 13, is provided in order to achieve a sufficient braking action in case of failure of the servo-brake apparatus 15—under utilization both of the higher brake pressure which establishes itself thereby in one of the brake circuits as also of the advantage of the smaller idling stroke of the brake pedal 16 and of the linkage 31 as a result of the abutment means 37 and 41. Either the brake pressure chamber 23 or the brake pressure chamber 32 can be pressure-relieved for disengaging the hydraulic drive connection. In the embodiments of FIGS. 1 and 2, the brake pressure chamber 32 of the primary transmitter brake piston 30 is pressure-relieved in each case because the other brake pressure chamber 23 is connected with the brake circuit 13 having the higher intended or rated brake output and the increase of the brake pressure in this brake circuit 13 has as a consequence a particularly high braking power output.

The housing 19 is provided with a valve housing connection 42 for a by-pass valve generally designated by reference numeral 43. A cylindrical threaded base 45 with a spring-loaded check valve 46 is securely screwed into a threaded bore 44 of the valve housing connection 42, which is in communication at its inner end with the cylinder connection 33. The check valve 46 is connected effectively between a valve chamber 47 connected with the cylinder connection 33 and a valve chamber 49 connected with a pressure-relieved return line 48 and is adapted to be pushed open by means of a valve plunger 50 displaceably inserted into the threaded base 45. The valve plunger 50 is actuated by a disengaging or disconnecting actuating motor generally designated by reference numeral 51 and operated by vacuum, which is connected to the threaded base 45 and essentially includes a working pressure chamber 52 which is under atmospheric pressure, a working pressure chamber 54 connected with the vacuum source 17 by way of a vacuum line 53, a disconnecting spring 55 as well as a piston membrane or diaphragm 56 cooperating with the valve plunger 50 and interconnected between the working pressure chambers 52 and 54. The valve plunger 50 is held in the illustrated working position in which the check valve 46 is closed and as a result thereof the brake pressure chamber 32 is closed off with respect to the return line 48, by the pressure difference produced by the vacuum source 17 between the working pressure chambers 52 and 54 and is displaced by the disconnecting actuating spring 55 into its disconnecting position opening the check valve 46 and therewith connecting the brake pressure chamber 32 with the return line 48, when the vacuum source 17 and therewith the servo-apparatus 15 fail, i.e., become inoperative.

The embodiment according to FIG. 2 of the brake installation according to the present invention is identical with the embodiment according to FIG. 1 except for a separating cylinder 57 integrated into the housing 19 of the master brake cylinder 14 and for the structural separation of the housing 19 and the construction as double-valve 58 of the by-pass or disengaging valve. The cylinder dead-end bore generally designated by reference numeral 59 of the separating cylinder 57 is closed off at its otherwise open end by a threaded plug 60 and is subdivided by means of a displaceable separating piston 61 having two sealing arrangements generally designated by reference numerals 62 and 63 arranged at an axial distance from one another, into a brake pressure chamber 65 connected with the secondary brake pressure chamber 23 by way of a housing opening 64, into a separating chamber 66 disposed between the sealing arrangements 62 and 63 and into a further brake pressure chamber 67. The separating chamber 66 is connected to the return line 48 by means of a cylinder connection 68, whereby the return line is connected with the brake fluid chamber 35 of the reservoir tank 27. Pressure equilization between the brake pressure chambers 65 and 67 is assured by the separating piston 61. The separating chamber 66 prevents that brake fluid losses as a result of leakages, non-tightnesses and the like in the line system connected to the one brake pressure chamber of the separating cylinder 57, can become effective on the line system connected with the other brake pressure chamber of the separating cylinder 57.

The brake pressure chamber 67 of the separating cylinder 57 is connected by way of a cylinder connection 69 and a brake pressure intermediate line 70 to a valve connection 71 of the double valve generally designated by reference numeral 58. A further valve connection 72 of the double valve 58 is in connection by way of a second brake pressure intermediate line 73 with the cylinder connection 33 of the housing 19 of the master brake cylinder 14. A third valve connection 74 of the double valve 58 is connected with the brake circuit 11 whereas the other brake circuit 13 is connected with the secondary brake pressure chamber 23 by way of the cylnder connection 24. Finally, the return line 48 is additionally connected to a fourth valve connection 75 of the double valve 58.

The valve-adjusting member 76 of the double-valve 58 which is constructed as valve slide member, is actuated by a disengaging or disconnecting actuating motor generally designated by reference numeral 51 which corresponds in construction and operation to the disengaging motor 51 of FIG. 1.

In the illustrated working position of the disconnecting motor 51 and of the valve-adjusting member 76, which is conditioned by the operation of the vacuum source 17 and of the servo-brake apparatus 15, the valve connections 72 and 74 are connected with each other and the two other valve connections 71 and 75 are closed off or blocked so that the primary brake pressure chamber 32 of the master brake cylinder 14 is connected with the brake circuit 11 and the brake pressure chamber 67 of the separating cylinder 57 is closed off.

In the disconnecting position of the valve-adjusting member 76 which is adjusted by the spring force in case of failure of the vacuum 17 or of the servo-apparatus 15, the valve connection 72 and therewith the primary brake pressure chamber 32 is closed off with respect to the valve connection 74 of the brake circuit 11 and is connected with the return line 48 by way of the valve connection 75. Furthermore, in this valve position, the valve connection 71 and therewith the brake pressure chamber 67 of the separating cylinder 57 is connected by way of a housing channel 77 of the valve housing 78 of the double valve 58 with the valve connection 74 and therewith with the brake circuit 11 so that the secondary transmitter brake piston 22 rigidly coupled with the primary transmitter brake piston 30 operates also on the brake circuit 11 by way of the separating piston 61 and the brake pressure chamber 67 of the separating cylinder 58 and the brake installation becomes thus a one-circuit system.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A multi-circuit brake installation for vehicles in which at least two transmitter piston means having differently large effective brake pressure piston areas and operatively connected with each other by a hydraulic drive connection means, operate within a master brake cylinder means actuatable at will by a servo-assist means, and in which the transmitter brake piston means are operatively connected with a respective brake circuit and are provided with means for limiting the relative movement with respect to one another, characterized by disconnecting means independent of the brake circuits for disconnecting the hydaulic drive connection means, said disconnecting means being positively displaced into the disconnecting position exclusively upon occurrence of a critical value of the servo-assist means.

2. A brake installation according to claim 1, characterized in that the servo-assist means includes a vacuum source.

3. A brake installation according to claim 1, characterized in that said means independent of the brake circuit includes a by-pass valve means.

4. A brake installation according to claim 1, characterized in that the means independent of the brake circuit include a double valve means.

5. A brake installation according to claim 1, characterized in that the hydraulic drive connection means includes a primary brake pressure chamber means.

6. A brake installation according to claim 1, characterized in that the master brake cylinder means includes a housing provided with a valve housing connecting means for a by-pass valve means.

7. A brake installation according to claim 1, in which the master cylinder means includes brake pressure chamber means, characterized in that the brake pressure chamber means of the master brake cylinder means which is pressure-relieved with a disengaged hydraulic drive connection means, is operable to be closed off with respect to its associated brake circuit.

8. A brake installation according to claim 7, characterized in that the brake circuit associated with the brake pressure chamber means that is pressure-relieved with a disengaged hydraulic drive connection means is operable to be shifted to another brake circuit.

9. A brake installation according to claim 8, characterized in that two brake circuits are adapted to be effectively connected together and in that limitedly movable, pressure-transmitting separating means are interconnectable between said two brake circuits.

10. A brake installation according to claim 9, characterized in that the separating means includes a separating piston means.

11. A brake installation according to claim 8, characterized in that a separating cylinder means is subdivided into two brake pressure chamber means by pressure-transmitting separating means, of which one brake pressure chamber means is provided with a pressure-medium connection for the connection with means for shifting the brake circuit, associated with the brake pressure chamber means of the master cylinder means which is pressure-relieved by the disengagement of the hydraulic drive-connection means, to another brake circuit and the other brake pressure chamber means is provided with a pressure-medium connection for the other brake circuit.

12. A brake installation according to claim 11, characterized in that the separating means includes a separating piston.

13. A brake installation according to claim 11, characterized in that the means for shifting the brake circuit to another brake circuit includes a double valve means.

14. A brake installation according to claim 11, characterized in that the pressure medium connection for the other brake circuit includes a housing opening.

15. A brake installation with the separating cylinder means receiving the separating piston according to claim 12, characterized in that the separating cylinder is provided with a central separating chamber located between its brake pressure chamber means, through which extends the separating piston, and in that the separating piston is provided with sealing means enclosing therebetween the two separating chamber means, of which one sealing means subdivides pressure-tight one brake pressure chamber means with respect to the separating chamber and the other sealing means subdivides pressure-tight the other brake pressure chamber means with respect to the separating chamber.

16. A brake installation according to claim 15, characterized by a double-valve means shiftable between a working position and a disconnecting position and having a discharge connection adapted to be pressure-relieved, a connection for the disengagement of the hydraulic drive-connection means, a connection for the brake circuit belonging to the brake pressure chamber means of the master brake cylinder means which is pressure-relieved by the disengagement of the hydraulic drive connection means, and a connection belonging to the other brake circuit, said double valve means in its working position operatively connecting the connection for the disengagement of the hydraulic drive connection means with the connection for the brake circuit associated with the brake pressure chamber means of the master brake cylinder means which is pressure-relieved by disengagement of the hydraulic drive connection means while closing off the remaining two connections, whereas in its disengaging position said double-valve means is operable to connect the connection for the disengagement of the hydraulic drive connection means with the discharge connection and the two other connections with each other.

17. A brake installation according to claim 16, characterized in that the master brake cylinder means and the separating cylinder means are in one piece.

18. A brake installation according to claim 1, characterized in that a separating cylinder means is subdivided into two brake pressure chamber means by pressure-transmitting separating means, of which one brake pressure chamber means is provided with a pressure-medium connection for the connection with means for shifting the brake circuit, associated with the brake pressure chamber means of the master cylinder means which is pressure-relieved by the disengagement of the hydraulic drive-connection means, to another brake circuit and the other brake pressure chamber means is provided with a pressure-medium connection for the other brake circuit.

19. A brake installation according to claim 18, characterized in that the separating means includes a separating piston.

20. A brake installation according to claim 18, characterized in that the means for shifting the brake circuit to another brake circuit includes a double valve means.

21. A brake installation according to claim 18, characterized in that the master brake cylinder means and the separating cylinder means are in one piece.

22. A brake installation according to claim 1, characterized by a double-valve means shiftable between a working position and a disconnecting position and having a discharge connection adapted to be pressure-relieved, a connection for the disengagement of the hydraulic drive-connection means, a connection for the brake circuit belonging to the brake pressure chamber means of the master brake cylinder means which is pressure-relieved by the disengagement of the hydraulic drive connection means, and a connection belonging to the other brake circuit, said double valve means in its working position operatively connecting the connection for the disengagement of the hydraulic drive connection means with the connection for the brake circuit associated with the brake pressure chamber means of the master brake cylinder means which is pressure-relieved by disengagement of the hydraulic drive connection means while closing off the remaining two connections, whereas in its disengaging position said double-valve means is operable to connect the connection for the disengagement of the hydraulic drive connection means with the discharge connection and the two other connections with each other.

23. A brake installation with a separating cylinder means receiving a separating piston according to claim 1, characterized in that the separating cylinder is provided with a central separating chamber located between its brake pressure chamber means, through which extends a separating means, and in that the separating means is provided with sealing means enclosing therebetween the two separating chamber means, of which one sealing means subdivides pressure-tight one brake pressure chamber means with respect to the separating chamber and the other sealing means subdivides pressure-tight the other brake pressure chamber means with respect to the separating chamber.

24. A brake installation according to claim 23, characterized in that the master brake cylinder means and the separating cylinder means are in one piece.

25. A brake installation according to claim 1, in which the master cylinder includes brake pressure chamber means, characterized in that the brake circuit associated with the brake pressure chamber means that is pressure-relieved with a disengaged hydraulic drive connection means, is operable to be shifted to another brake circuit.

26. A brake installation according to claim 25, characterized in that two brake circuits are adapted to be effectively connected together and in that limitedly movable, pressure-transmitting separating means are interconnectable between said two brake circuits.

27. A brake installation according to claim 26, characterized in that the separating means includes a separating piston means.

* * * * *